United States Patent
Chung

(10) Patent No.: US 11,330,166 B2
(45) Date of Patent: May 10, 2022

(54) METHOD OF AUTOMATICALLY PHOTOGRAPHING AN IMAGE, IMAGE PROCESSING DEVICE AND IMAGE PROCESSING SYSTEM PERFORMING THE SAME

(71) Applicant: Samsung Electronics Co., Ltd., Suwon-si (KR)

(72) Inventor: Hongsuk Chung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/003,171

(22) Filed: Aug. 26, 2020

(65) Prior Publication Data
US 2021/0235009 A1 Jul. 29, 2021

(30) Foreign Application Priority Data
Jan. 29, 2020 (KR) ........................ 10-2020-0010265

(51) Int. Cl.
*H04N 5/232* (2006.01)

(52) U.S. Cl.
CPC ..... *H04N 5/23218* (2018.08); *H04N 5/23238* (2013.01); *H04N 5/23245* (2013.01)

(58) Field of Classification Search
CPC .......... H04N 5/23218; H04N 5/23245; H04N 5/23238
See application file for complete search history.

(56) References Cited

U.S. PATENT DOCUMENTS

| | | |
|---|---|---|
| 7,623,678 B2 | 11/2009 | Masaki |
| 7,787,762 B2 | 8/2010 | Abe |
| 8,477,993 B2 | 7/2013 | Matsuura |
| 8,957,981 B2 | 2/2015 | Fredlund et al. |
| 10,129,455 B2 | 11/2018 | Du et al. |
| 2020/0236281 A1* | 7/2020 | Arai ................... H04N 5/23238 |
| 2020/0236296 A1* | 7/2020 | Holzer .................... G06T 7/001 |
| 2021/0058549 A1* | 2/2021 | Ji ............................ G10L 17/00 |

FOREIGN PATENT DOCUMENTS

| | | |
|---|---|---|
| JP | 20070074296 A | 3/2007 |
| JP | 4442330 B2 | 3/2010 |
| JP | 20100273280 A | 12/2010 |
| JP | 20120098652 A | 5/2012 |
| JP | 20140143595 A | 8/2014 |

* cited by examiner

*Primary Examiner* — Joseph W Becker
(74) *Attorney, Agent, or Firm* — Harness, Dickey & Pierce, P.L.C.

(57) ABSTRACT

A method of photographing an image using a camera includes determining a photographing mode; searching and tracking a main object including a photographer; and automatically photographing the image based on the photographing mode and a movement of the main object.

18 Claims, 15 Drawing Sheets

METHOD OF AUTOMATICALLY PHOTOGRAPHING AN IMAGE, IMAGE PROCESSING DEVICE AND IMAGE PROCESSING SYSTEM PERFORMING THE SAME

CROSS-REFERENCE TO RELATED APPLICATION

This U.S. non-provisional application claims priority under 35 USC § 119 to Korean Patent Application No. 10-2020-0010265, filed on Jan. 29, 2020, in the Korean Intellectual Property Office (KIPO), the disclosure of which is incorporated by reference herein in its entirety.

BACKGROUND

1. Technical Field

One or more example embodiments of the inventive concepts relate generally to a method of photographing an image, and more particularly to a method of automatically photographing an image, image processing device and image processing system performing the method.

2. Discussion of the Related Art

When a photographer photographs an object, the photographer may easily check a natural posture of the object, determine the moment the object is stationary, and press the shutter. However, when the photographer is included in the image to be photographed, it may be difficult to determine the proper moment to press the shutter.

SUMMARY

One or more example embodiments of the inventive concepts may provide a method of photographing an image, image processing device and image processing system performing the method, capable of automatically photographing an image.

According to one or more example embodiments of the inventive concepts, a method of photographing an image using a camera, includes, determining a photographing mode, searching and tracking a main object including a photographer, and automatically photographing the image based on the photographing mode and a movement of the main object.

According to one or more example embodiments of the inventive concepts, a method of automatically photographing an image using a camera, includes, searching and tracking a main object including a photographer, and generating a plurality of single images by detecting changes in an angle of a camera when a photographing mode of the camera is a panorama image photographing mode, and when a movement of the main object is not detected until a photographing preparation time elapses, and generating the panorama image based on the plurality of single images.

According to one or more example embodiments of the inventive concepts, a method of automatically photographing an image using a camera, includes, searching and tracking a main object including a photographer, and generating a video image when a photographing mode of a camera is a video image photographing mode, and when a movement of the main object is not detected until a photographing preparation time elapses.

A method of automatically photographing an image, an image processing device and an image processing system according to one or more example embodiments of the inventive concepts may search and track the main object, and may automatically photograph an image based on the photographing mode and a movement of the main object, when the photographer is the main object.

BRIEF DESCRIPTION OF THE DRAWINGS

Example embodiments of the present disclosure will be more clearly understood from the following detailed description taken in conjunction with the accompanying drawings.

DETAILED DESCRIPTION OF THE EMBODIMENTS

Figure 1:
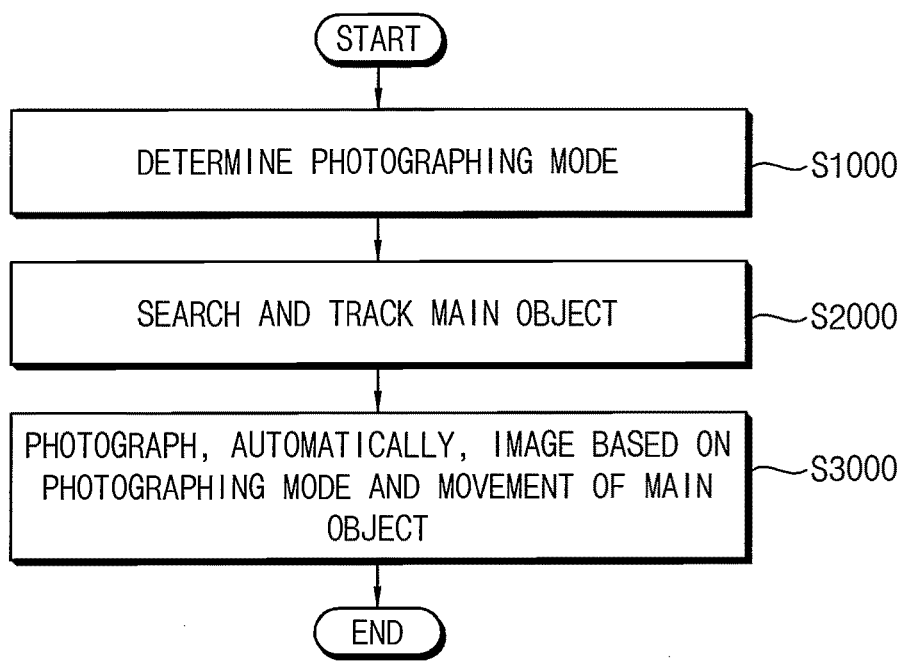
FIGS. 1 and 2 are flowcharts illustrating a method of automatically photographing an image according to one or more example embodiments of the inventive concepts.

In the specification, a method of automatically photographing an image, image processing device and image processing system performing the method will be described.

The image is considered to include a still image, a panorama image, and a video image. The photographing of the image is considered as a concept including a process of generating and storing the image. In some example embodiments, it is assumed that a photographer himself becomes a main object and uses a camera to photograph the image. The camera includes not only a traditional camera but also a mobile phone, a smart phone, a tablet personal computer (PC), a laptop computer, a digital camera, a camcorder, a portable game console and a wearable device.

Various example embodiments will be described more fully hereinafter with reference to the accompanying drawings, in which some example embodiments are shown. In the drawings, like numerals refer to like elements throughout. The repeated descriptions may be omitted.

Figure 2:
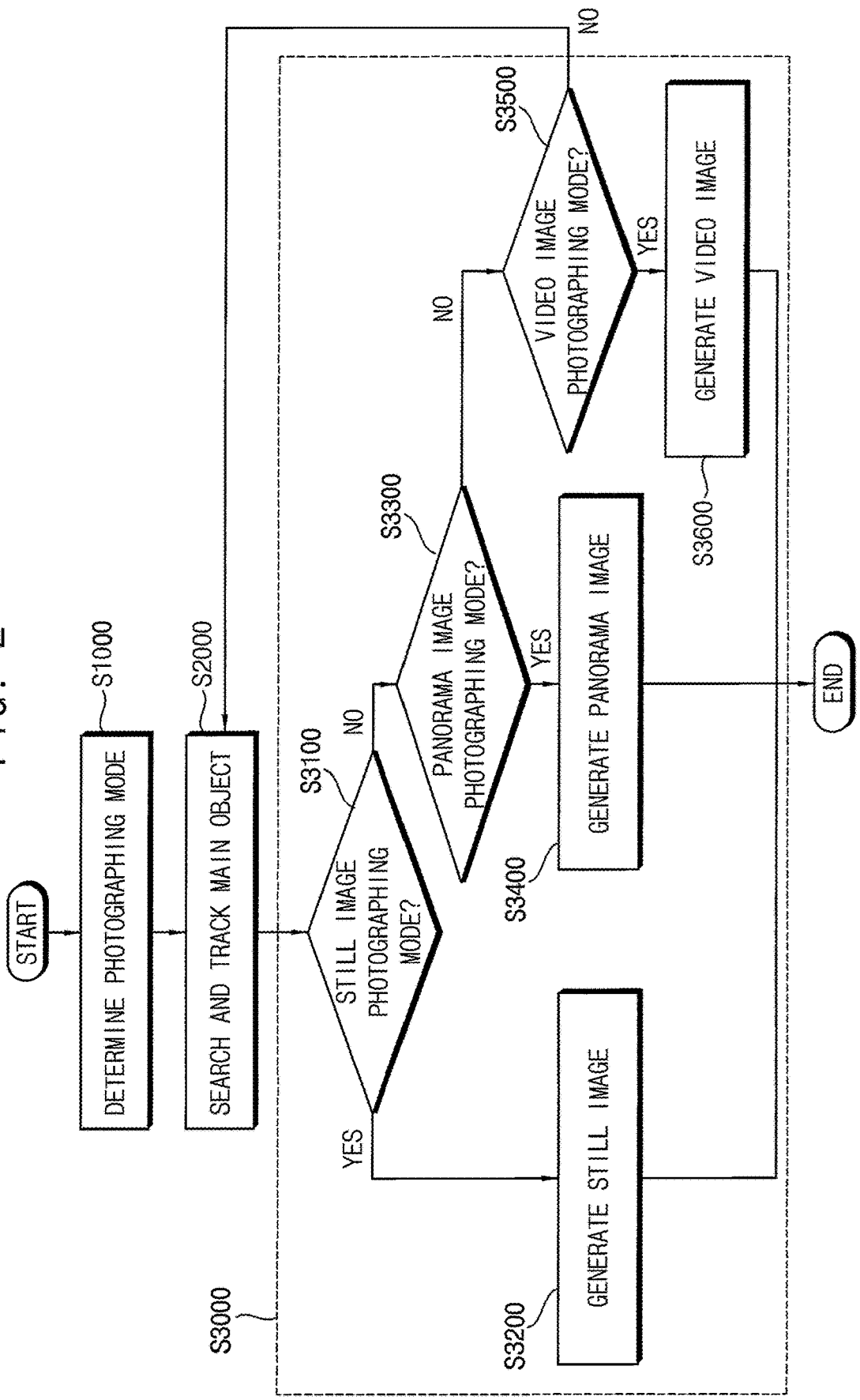

FIGS. 1 and 2 are flowcharts illustrating a method of automatically photographing an image according to one or more example embodiments of the inventive concepts.

Referring to FIGS. 1 and 2, a photographing mode may be determined (S1000). The photographing mode indicates one of operation modes for the camera to photograph the image, and may include a still image photographing mode, a panorama image photographing mode and a video image photographing mode corresponding to a still image, a panorama image and a video image, respectively.

The photographing mode may be determined by receiving a signal indicating the photographing mode. The signal may be input by a user before photographing the image automatically. In some example embodiments, the user may be the photographer.

The main object may be searched and tracked (S2000) after the photographing mode is determined (S1000). The main object may include the photographer. The main object may be the photographer when the photographer is photographed with other objects as well as when the photographer is photographed alone. The main object may be searched by being determined in a candidate group of the main object or being forcibly designated. According to an embodiment, the candidate group of the main object may include the photographer and other objects, and according to another embodiment, may further include background. The main object may be tracked for the determined main object when the main object is determined according to the search of the main object.

After searching and tracking the main object (S2000), an image may be automatically photographed based on the photographing mode and a movement of the main object (S3000).

The movement of the main object may be detected based on a change in a relative position between the camera and the main object, a change in a distance between the camera and the main object and a change in a background. The image may be automatically photographed corresponding to the photographing mode. When the photographing mode is a still image photographing mode (S3100: YES), a still image is photographed (S3200), when the photographing mode is a panorama image photographing mode (S3100: NO and S3300: YES), a panorama image is photographed (S3400) and when the photographing mode is a video image photographing mode (S3300: NO and S3500: YES) a video image is photographed (S3600). That is, in the method of automatically photographing an image according to at least on example embodiment of the inventive concepts, when the photographer is the main object, the main object is searched and tracked, and an image is automatically photographed based on the photographing mode and the movement of the main object.

Figure 3:
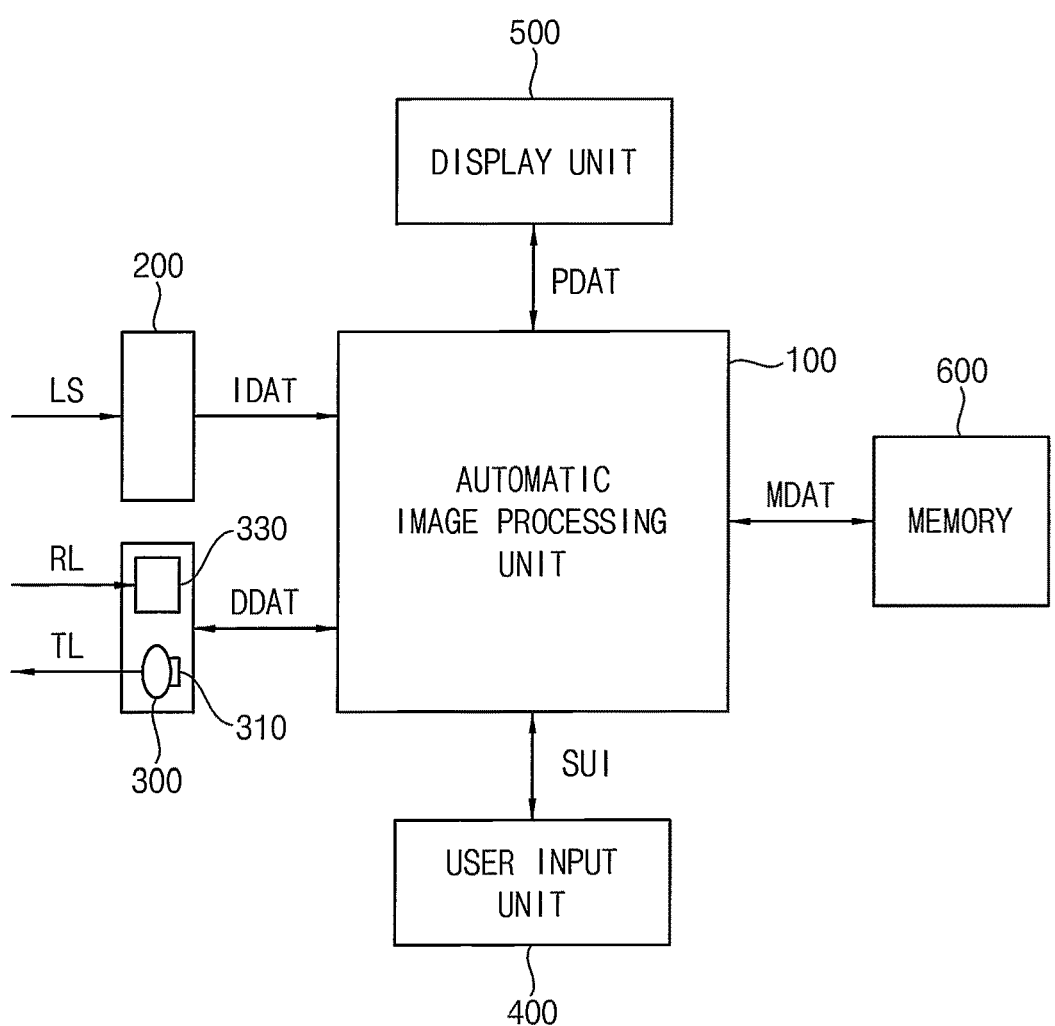
FIG. 3 is a block diagram illustrating an image processing device according to one or more example embodiments of the inventive concepts.

FIG. 3 is a block diagram illustrating an image processing device according to one or more example embodiments of the inventive concepts.

Referring to FIG. 3, the image processing device may include an automatic image processing unit 100, an image sensor module 200, a distance sensor module 300, a user input unit 400, a display unit 500 and a memory 600.

The image sensor module 200 may include a lens, an image sensor and an image sensor driving unit. The lens and the image sensor may be driven by the driving unit, the lens may concentrate a received optical signal LS to the image sensor, and the image sensor may generate image data IDAT. In some example embodiments, the image data IDAT may be RGB image data. In some example embodiments, the image sensor may include either a complementary metal oxide semiconductor (CMOS) image sensor or a charge-coupled device (CCD) image sensor, but example embodiments are not limited thereto.

The distance sensor module 300 may include a light source 310, a distance sensor 330, and a distance sensor driving unit. The light source 310 and the distance sensor 330 may be driven by the distance sensor driving unit, the light source 310 may irradiate in an infrared light band or a visible light band, and the distance sensor 330 may generate distance data DDAT. In some example embodiments, the distance data DDAT may be depth image data. In some example embodiments, the distance sensor 330 may include a time of flight (TOF) sensor, but example embodiments are not limited thereto. The automatic image processing unit 100 may receive the image data IDAT from the image sensor module 200 and the distance data DDAT from the distance sensor module 300. The automatic image processing unit 100 performs the method of FIGS. 1 and 2 based on the received data IDAT and DDAT, and transfer image data MDAT generated by performing the method to the memory 600. The automatic image processing unit 100 may receive a signal SUI input by a user from the user input unit 400 and may transfer display data PDAT to the display unit 500. In some example embodiments, the signal SUI input by the user may be a signal for determining a photographing mode, a photographing preparation time or forcibly designating the main subject, but example embodiments are not limited thereto.

According to at least some example embodiments of the inventive concepts, the automatic image processing unit 100 (and/or elements of the automatic image processing unit 100) may be or include processing circuitry such as hardware including logic circuits; a hardware/software combination executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

Figure 4:
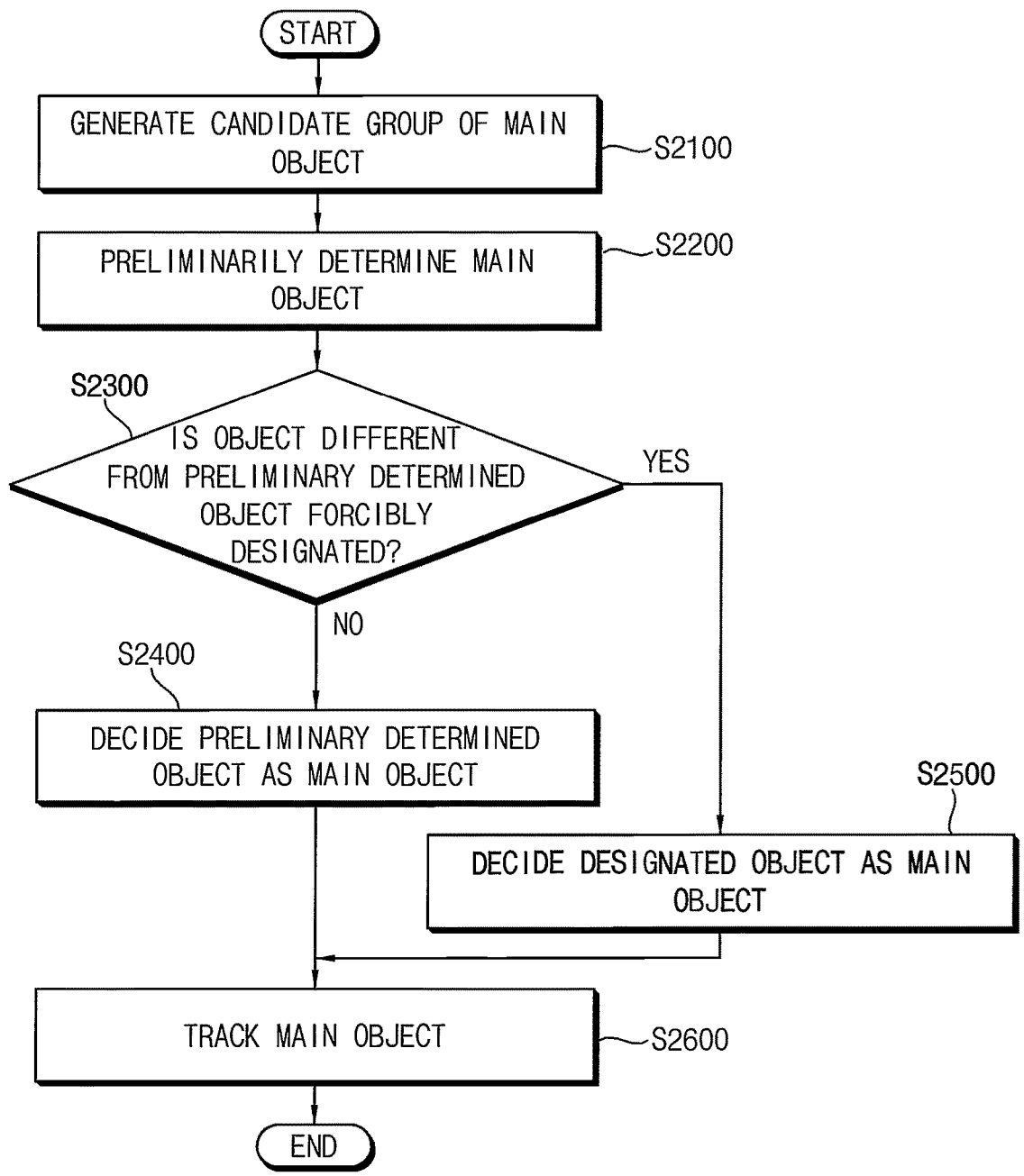
FIG. 4 is a flowchart illustrating an example embodiment of searching and tracking a main object included in the methods of FIGS. 1 and 2 according to one or more example embodiments of the inventive concepts.

FIG. 4 is a flowchart illustrating an example embodiment of searching and tracking a main object including a photographer of FIGS. 1 and 2.

Referring to FIGS. 3 and 4, the automatic image processing unit 100 may generate a candidate group of the main object (S2100). The candidate group of the main object may include the photographer, other objects and a background. The automatic image processing unit 100 may receive each of the image data IDATA and the distance data DDAT in units of frames. In some example embodiments, the automatic image processing unit 100 may divide each frame of the image data IDAT into a plurality of first regions according to a first criterion, and may divide each frame of the distance data DDAT into a plurality of second regions according to a second criterion.

In some example embodiments, the first criterion may include color information, and the second criterion may include distance information, but example embodiments are not limited thereto. The automatic image processing unit 100 may generate motion information for each of the plurality of first regions and second regions based on one frame of image data IDAT and the next frame subsequent to the one frame of image data IDAT. The automatic image processing unit 100 may generate a candidate group of the main object based on the motion information. In some example embodiments, the motion information may be expressed in a form of a vector. Hereinafter, a process in which the automatic image processing unit 100 generates the candidate group of the main object will be described in more detail.

Figure 5:
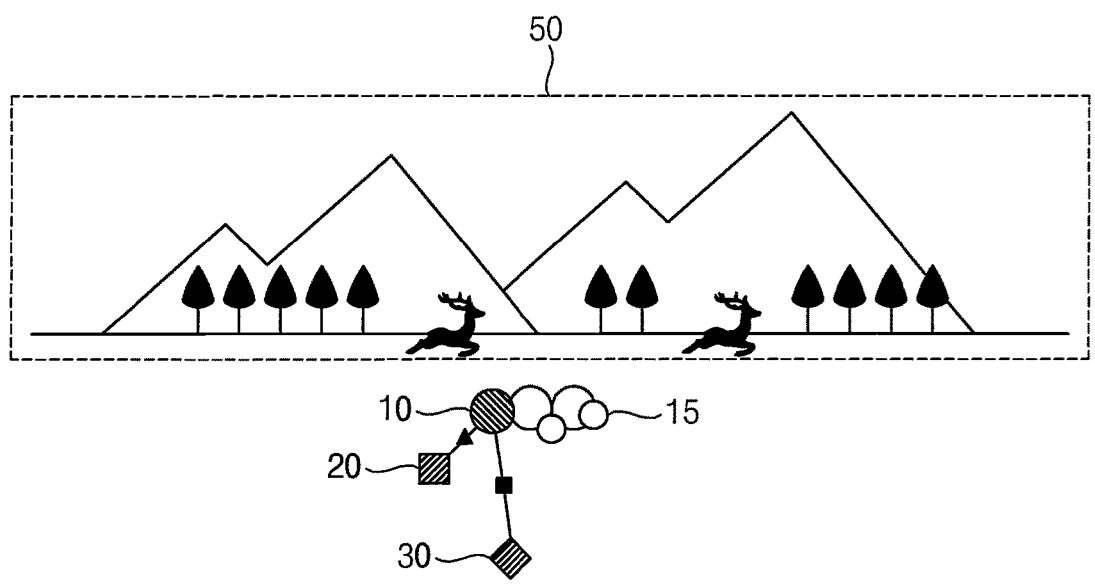
FIG. 5 is a diagram illustrating a process of generating a candidate group of a main object according to one or more example embodiments of the inventive concepts.

FIG. 5 is a diagram illustrating a process of generating a candidate group of the main object.

In FIG. 5, a photographer 10, other objects 15 and a background 50 are illustrated. The photographer 10 may position a camera in the first place 20 close to the photographer 10 and the other objects 15, or may position a camera in the second place 30 relatively far from the first place 20. It is assumed that the first place 20 is a place where the photographer 10 dose not need to move to position the camera, and the second place 30 is a place where the photographer 10 need to move to position the camera.

Referring to FIG. 5, the automatic image processing unit 100 may generate the candidate group of the main object based on the color information and the distance information.

In some example embodiments, when the camera is positioned at either the first place 20 or the second place 30, the automatic image processing unit 100 may eliminate the background 50 from the candidate group of the main object based on the distance information. In this case, the automatic image processing unit 100 may determine that only the photographer 10 is included in the candidate group of the main object or may include the photographer 10 and other objects 15, based on the distance information and the color information.

In some example embodiments, the automatic image processing unit 100 may generate the candidate group of the main object after the photographer 10 positions the camera at an arbitrary location. In this case, when the camera is positioned in the first place 20, the photographer 10 and other objects 15 may be included in the candidate group of the main object based on the distance information and the color information. In contrast, when the camera is positioned in the second place 30, only the photographer 10 may be included in the candidate group of the main object based on the distance information and the color information.

Referring to FIG. 4 again, the automatic image processing unit 100 may preliminarily determine the main object (S2200) after generating the candidate group of the main object. For example, the automatic image processing unit 100 may decide or designate, as the main object, one object from among objects included in the candidate group of the main object.

According to an embodiment, the main object may be preliminarily determined based on the color information and the plurality of first regions. The color information may include color information corresponding to a skin color of a human. An object determined to exist in the center region of each frame of image data IDAT among the plurality of the first regions as described above may be preliminarily determined as the main object. However, example embodiments are not limited thereto. According to another embodiment, the main object may be preliminarily determined based on the color information, the plurality of first regions, distance information and the plurality of second regions.

When an object different from the preliminarily determined object is forcibly designated (S2300: YES), the designated object may be decided as the main object (S2500). When the object different from the preliminarily determined object is not forcibly designated (S2300: NO), the preliminarily determined object may be decided as the main object (S2400). The main object may be forcibly designated based on a signal SUI input by a user.

The automatic image processing unit 100 may track the determined main object (S2600). The main object may be tracked based on the color information and the distance information.

In some example embodiments, a background distinguished from the main object is defined as a result of tracking the main object, and motion information and distance information for each of the main object and the background may be generated.

In some example embodiments, the motion information may be generated based on the image data IDAT, and the distance information may be generated based on the distance data DDAT. Further, based on the motion information and the distance information for each of the main object and the background, a change in a relative position between the camera and the main object, a change in a distance between the camera and the main object and a change of a background may be detected.

In some example embodiments, a change in the relative position between the camera and the main object may be detected based on the motion information for the main object and the distance information for the background. When the movement of the main object is not changed and the distance of the background is not changed, it may be considered that a change in the relative position between the camera and the main object is not exists. In contrast, when the movement of the main object is not changed and the distance of the background is changed, it may be considered that a change in the relative position between the camera and the main object exists.

In some example embodiments, a change in a distance between the camera and the main object may be detected based on the distance information for the main object and a change of background may be detected based on the motion information or the distance information for the background.

Figure 6:
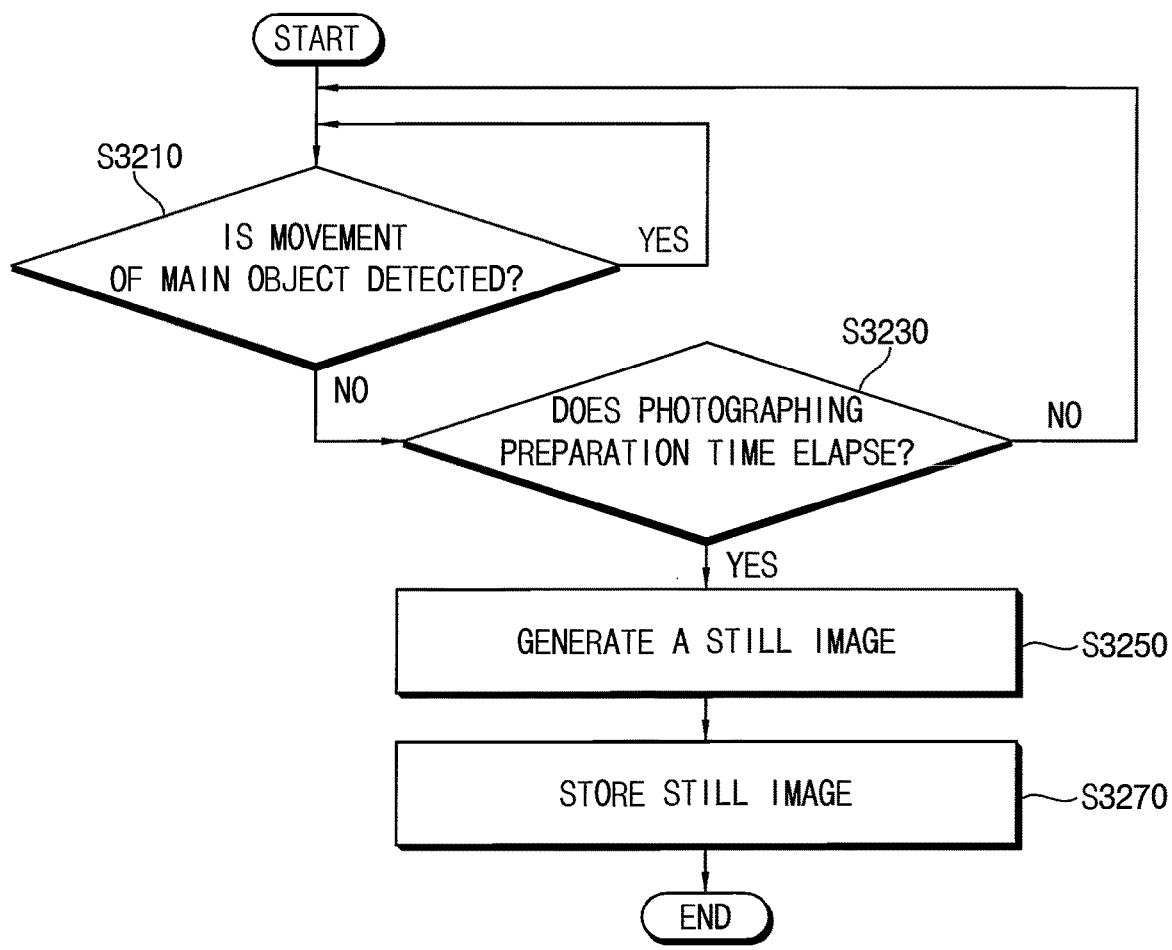
FIG. 6 is a flowchart for describing an example embodiment of photographing a still image included in the method of FIG. 2 according to one or more example embodiments of the inventive concepts.

FIG. 6 is a flowchart for describing an example embodiment of photographing a still image included in the method of FIG. 2.

Figure 7A:
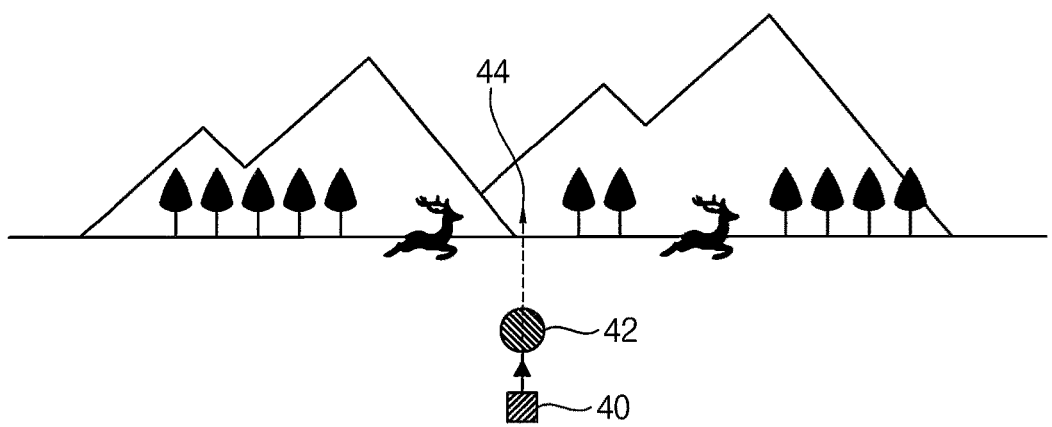
FIG. 7A is a diagram for describing a change in a relative position and a distance between a camera and a main object in a process of generating the still image.
Figure 7B:
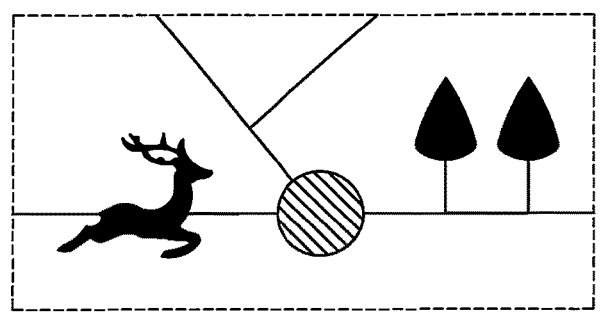
FIG. 7B is a diagram for describing the process of generating the still image according to one or more example embodiments of the inventive concepts.

FIG. 7A is a diagram for describing a change in a relative position and a distance between a camera and a main object in a process of generating the still image, and FIG. 7B is a diagram for describing the process of generating the still image.

Referring to FIG. 6, when the movement of the main object is not detected (S3210: NO) until a photographing preparation time elapses (S3230: YES), the automatic image processing unit 100 may generate the still image (S3250), and may store the generated still image in the memory 600 (S3270). The movement of the main object may be detected by detecting the change in the relative position between the camera and the main object, the change in the distance between the camera and the main object and the change of the background. The photographing preparation time may be determined based on a signal SUI input by a user. In some example embodiments, the automatic image processing unit 100 considers that the movement of the main object is not detected when the relative position between the camera and the main object, the distance between the camera and the main object and the background are not changed. And then, when the photographing preparation time elapses, the automatic image processing unit 100 may photograph the main object to generate the still image.

Referring to FIG. 7A, a position 40 of the camera, a position 42 of the main object and a background 44 are not changed while the automatic image processing unit 100 generates the still image. Therefore, the relative position between the camera and the main object, the distance between the camera and the main object and the background are not changed. In this case, since the movement of the main object is not detected, the automatic image processing unit 100 may generate the still image by photographing the main object until the photographing preparation time elapses.

Referring to FIG. 7B, the still image is generated by the automatic image processing unit 100 simply photographing the main object, and in the process of generating the still image, additional processing performed in the process of generating a panorama image or a video image, which will be described later, is not required.

Figure 8:
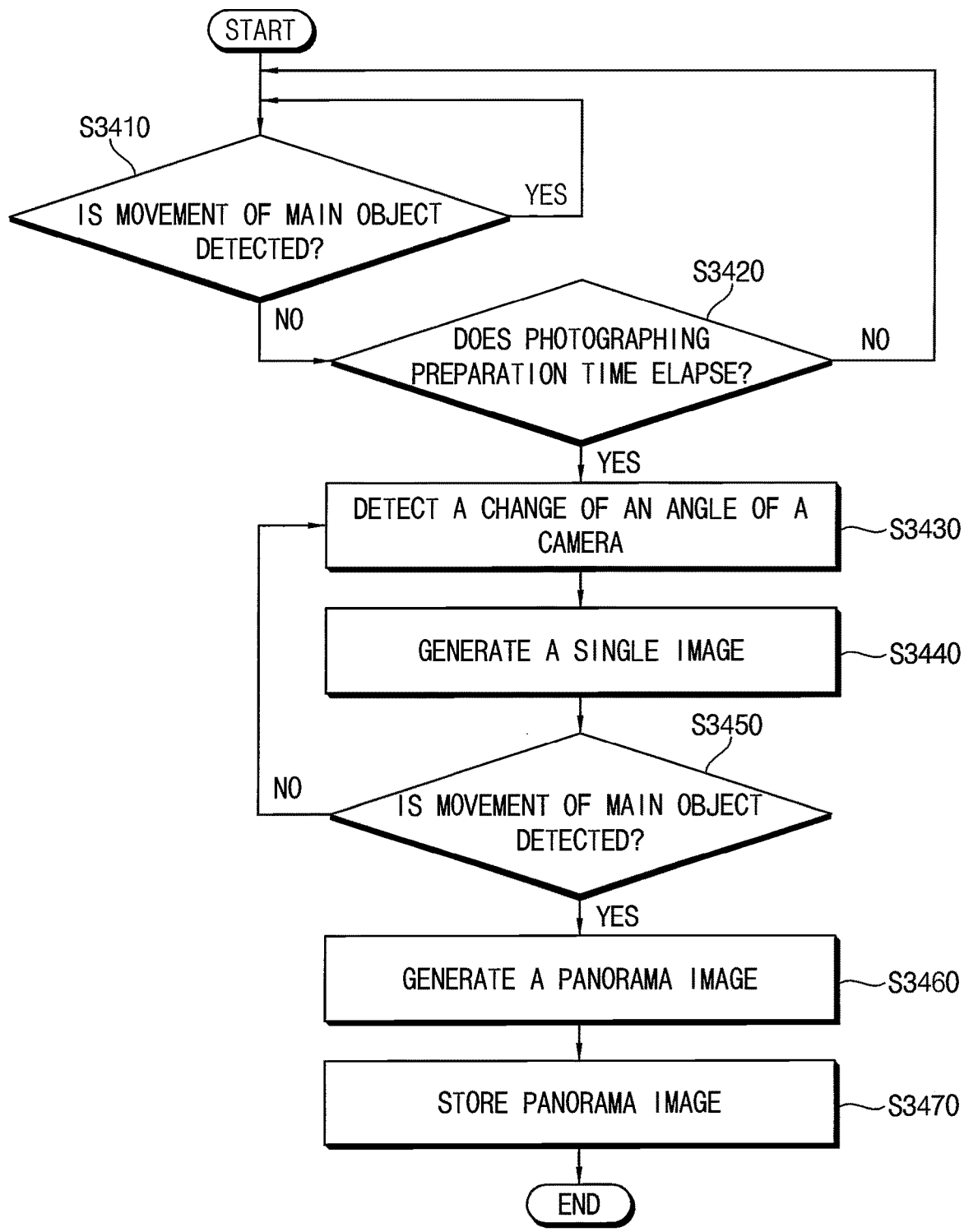
FIG. 8 is a flowchart illustrating an example embodiment of photographing a panorama image included in the method of FIG. 2 according to one or more example embodiments of the inventive concepts.
Figure 9A:
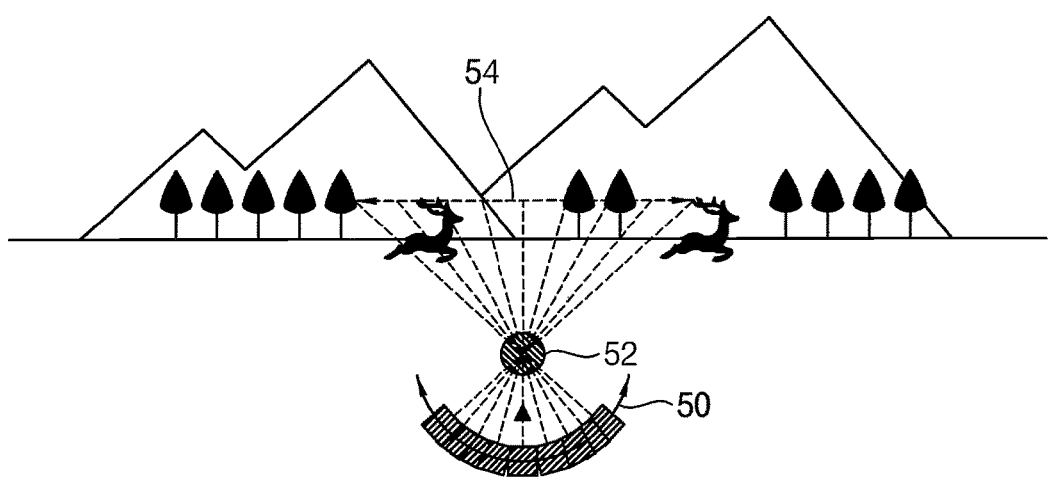
FIG. 9A is a diagram for describing a change in a relative position and a distance between a camera and a main object in a process of generating the panorama image.

FIG. 8 is a flowchart illustrating an example embodiment of photographing a panorama image included in the method of FIG. 2. FIG. 9A is a diagram for describing a change in a relative position and a distance between a camera and a main object in a process of generating the panorama image, and FIG. 9B is a diagram for describing the process of generating the panorama image.

Referring to FIG. 8, when the movement of the main object is not detected (S3410: NO) until a photographing preparation time elapses (S3420: YES), the automatic image processing unit 100 may capture a plurality of single images by detecting changes in an angle of the camera (S3430 and S3440). The movement of the main object may be detected by detecting the change in the relative position between the camera and the main object, the change in the distance between the camera and the main object, and the change of the background. The photographing preparation time may be determined based on a signal SUI input by a user. After generating one single image (S3440), when the movement of the main object is not detected (S3450: NO), the automatic image processing unit 100 repeatedly detects the change of the angle of the camera (S3430), generates another single image. In some example embodiments, the automatic image processing unit 100 considers that the movement of the main object is not detected when the relative position between the camera and the main object are changed and the background are changed but when the distance between the camera and the main object are not changed. And then, when the photographing preparation time elapses, the automatic image processing unit 100 may photograph the main object to generate the plurality of single images.

Referring to FIG. 9A, a position 52 of the main object are not changed but a position 50 of the camera and the background are changed while the automatic image processing unit 100 generates the panorama image. Therefore, the distance between the camera and the main object is changed, but the background and the relative position between the camera and the main object are changed. However, in the process of generating the panorama image, unlike the process of generating the still image, the automatic image processing unit 100 considers the movement of the main object is not detected when the background and the relative position between the camera and the main object are changed but when the distance between the camera and the main object are not change. And then, when the change of the angle of the camera is detected, the automatic image processing unit 100 may photograph the main object to generate the single image. The change of the angle of the camera may be detected based on the color information. After generating the single image (S3440), when the movement of the main object is detected (S3450: YES), the automatic image processing unit 100 may generate the panorama image (S3460), and may store the generated panorama image in the memory 600 (S3470).

Figure 9B:
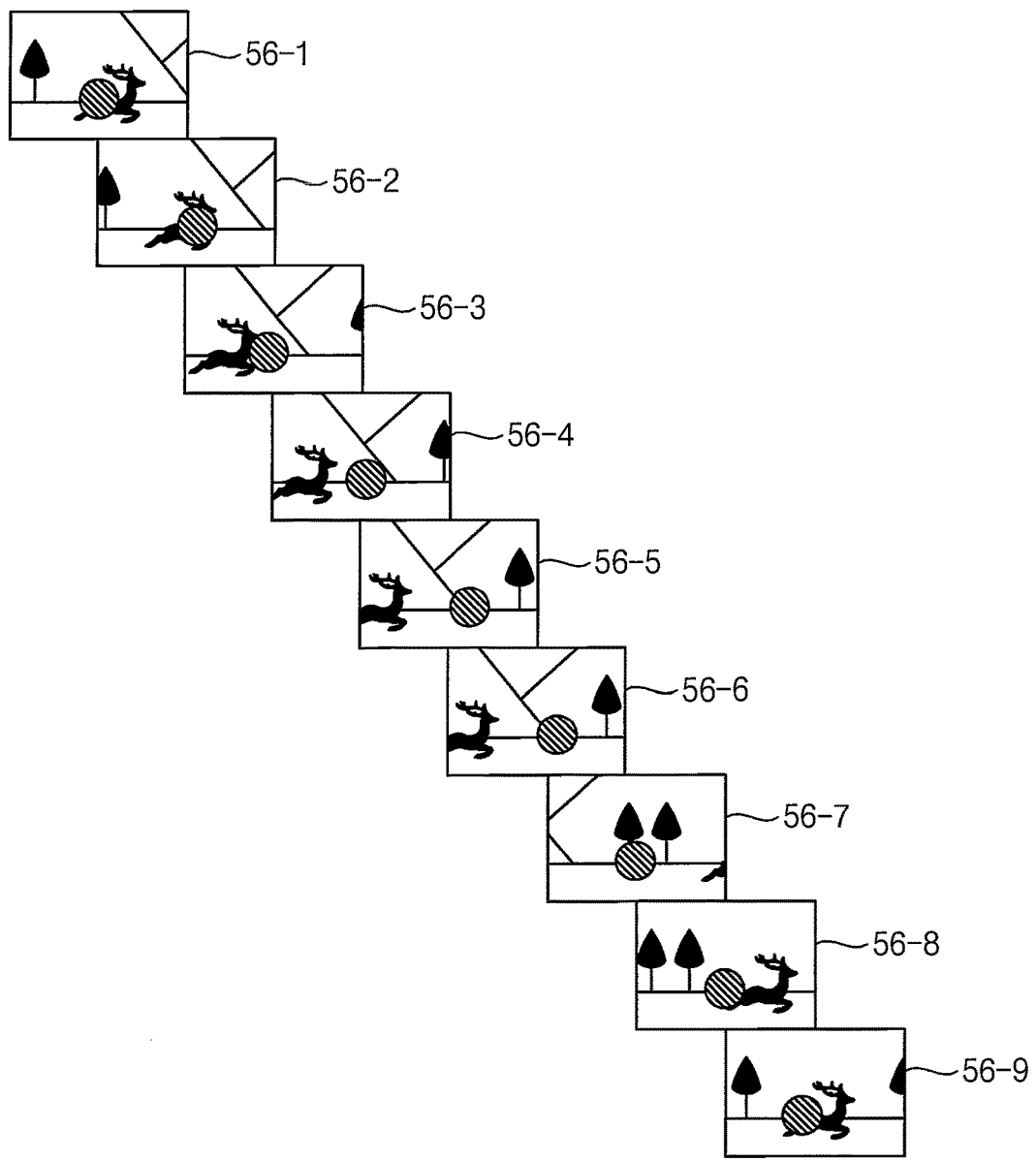
FIG. 9B is a diagram for describing the process of generating the panorama image according to one or more example embodiments of the inventive concepts.

Referring to FIG. 9B, the panorama image may be generated based on the plurality of single images 56-1 to 56-9 generated by the automatic image processing unit 100 sensing the change of the angle of the camera and photographing the main object. In this case, the automatic image processing unit 100 may determine any one of the plurality of single images 56-1 to 56-9, for example, 56-5, as a basic image. The automatic image processing unit 100 may generate reference images by removing an area including the main object from rest images, for example, 56-1 to 56-4 and 56-6 to 56-9 when the basic image is 56-5, among the plurality of single images except the basic image, for example, 56-5. The automatic image processing unit 100 may generate the panorama image based on the basic image and the reference images. According to an embodiments, the image determined as the basic image is an image having a median index value among index values that are assigned to the plurality of single images in a capturing order. According to another embodiment, the image determined as the basic image is an image having a median index value among index values that are assigned in a capturing order to the plurality of single images including the main object.

Figure 10:
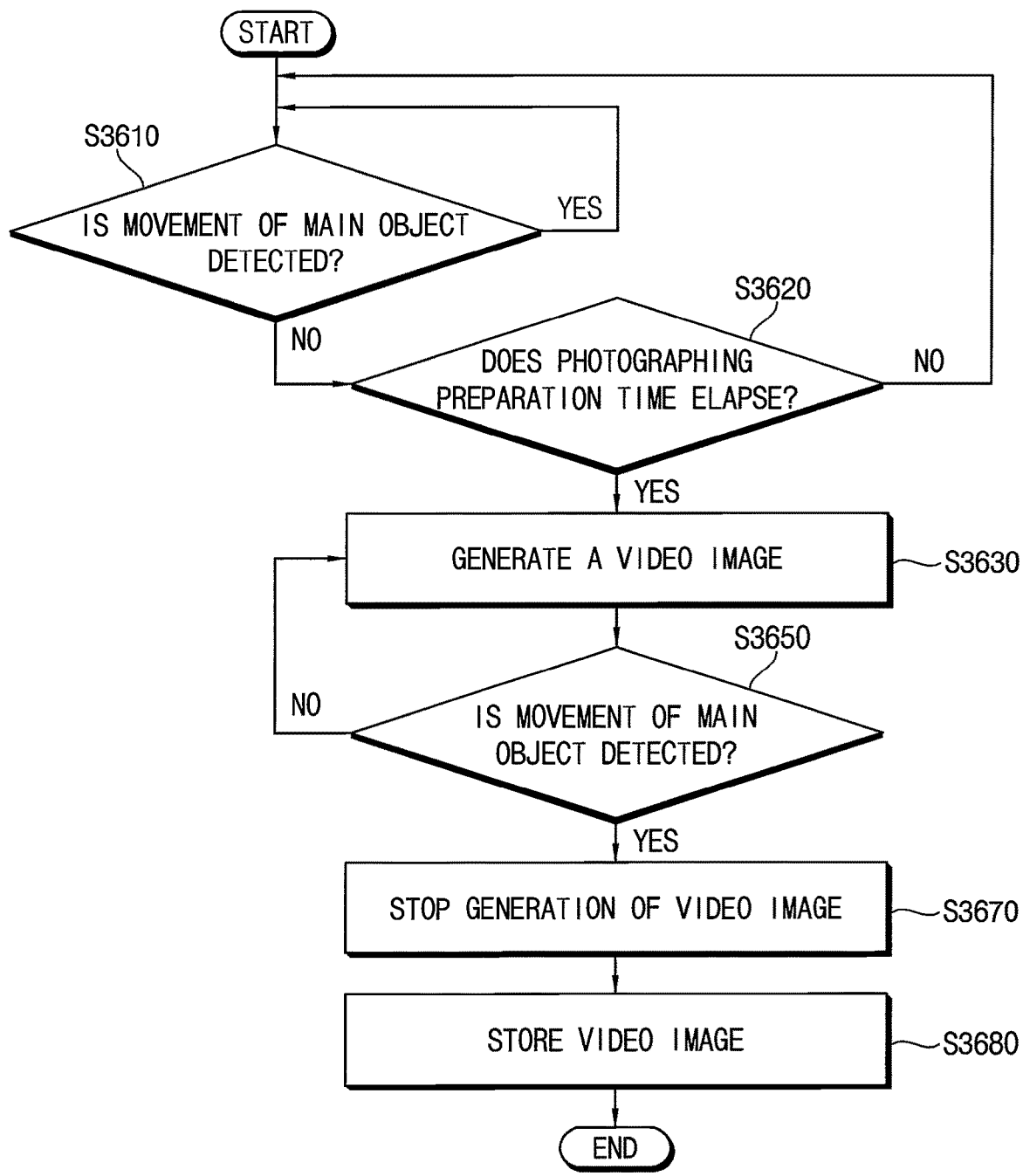
FIG. 10 is a flowchart illustrating an example embodiment of photographing a video image included in the method of FIG. 2 according to one or more example embodiments of the inventive concepts.
Figure 11A:
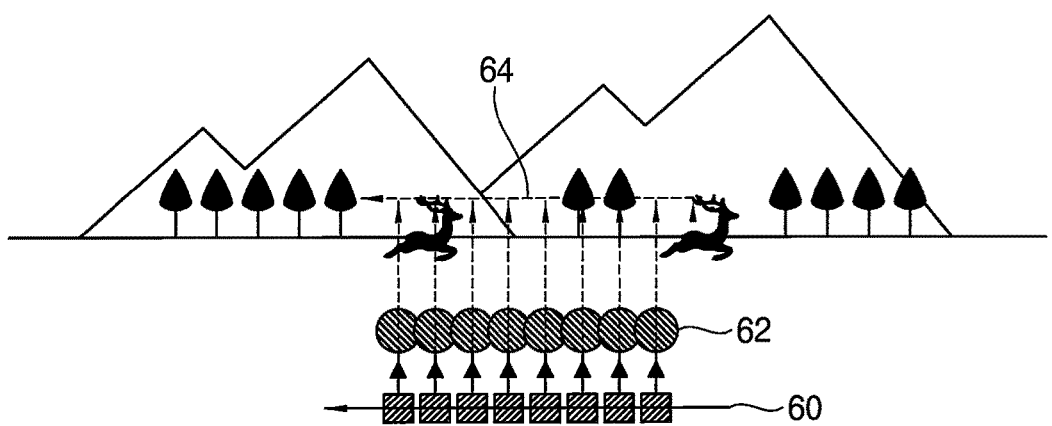
FIG. 11A is a diagram for describing a change in a relative position and a distance between a camera and a main object in a process of generating the video image.

FIG. 10 is a flowchart illustrating an example embodiment of photographing a video image included in the method of FIG. 2. FIG. 11A is a diagram for describing a change in a relative position and a distance between a camera and a main object in a process of generating the video image, and FIG. 11B is a diagram for describing the process of generating the video image.

Referring to FIG. 10, when the movement of the main object is not detected (S3610: NO) until a photographing preparation time elapses (S3620: YES), the automatic image processing unit 100 may generate the video image (S3630). The movement of the main object may be detected by detecting the change in the relative position between the camera and the main object, the change in the distance between the camera and the main object, and the change of the background. The photographing preparation time may be determined based on a signal SUI input by a user. In some example embodiments, the automatic image processing unit 100 considers that the movement of the main object is not detected when the background is changed but when the relative position and the distance between the camera and the main object are not changed. And then, when the photographing preparation time elapses, the automatic image processing unit 100 may photograph the main object to generate the video image.

Referring to FIG. 11A, the background is changed but a position 62 of the main object and a position 64 of the camera are equally changed in the same direction different from the direction of the background while the automatic image processing unit 100 generates the video image. Therefore, the relative position and the distance between the camera and the main object are not changed, and only the background is changed. In some example embodiments, the automatic image processing unit 100 considers that the movement of the main object is not detected when the distance and the relative position between the camera and the main object are not changed, but only the background is changed. And then, when the photographing preparation time elapses, the automatic image processing unit 100 may photograph the main object to generate the video image. The automatic image processing unit 100 may generate the video image (S3630), and when the movement of the main object is detected (S3650: YES), may stop the generation of the video image (S3670), and may store the generated video image in memory 600.

Figure 11B:
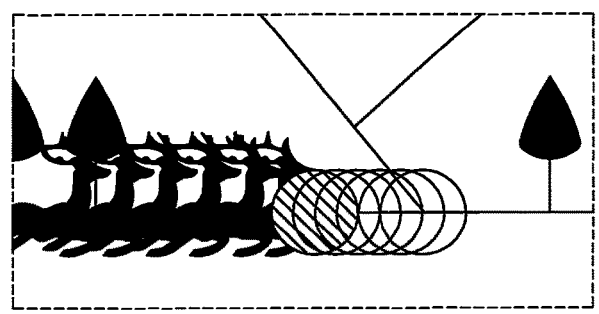
FIG. 11B is a diagram for describing the process of generating the video image according to one or more example embodiments of the inventive concepts.

Referring to FIG. 11b, the automatic image processing unit 100 may generate the video image by photographing the main object only until the movement of the main object is detected.

Figure 12:
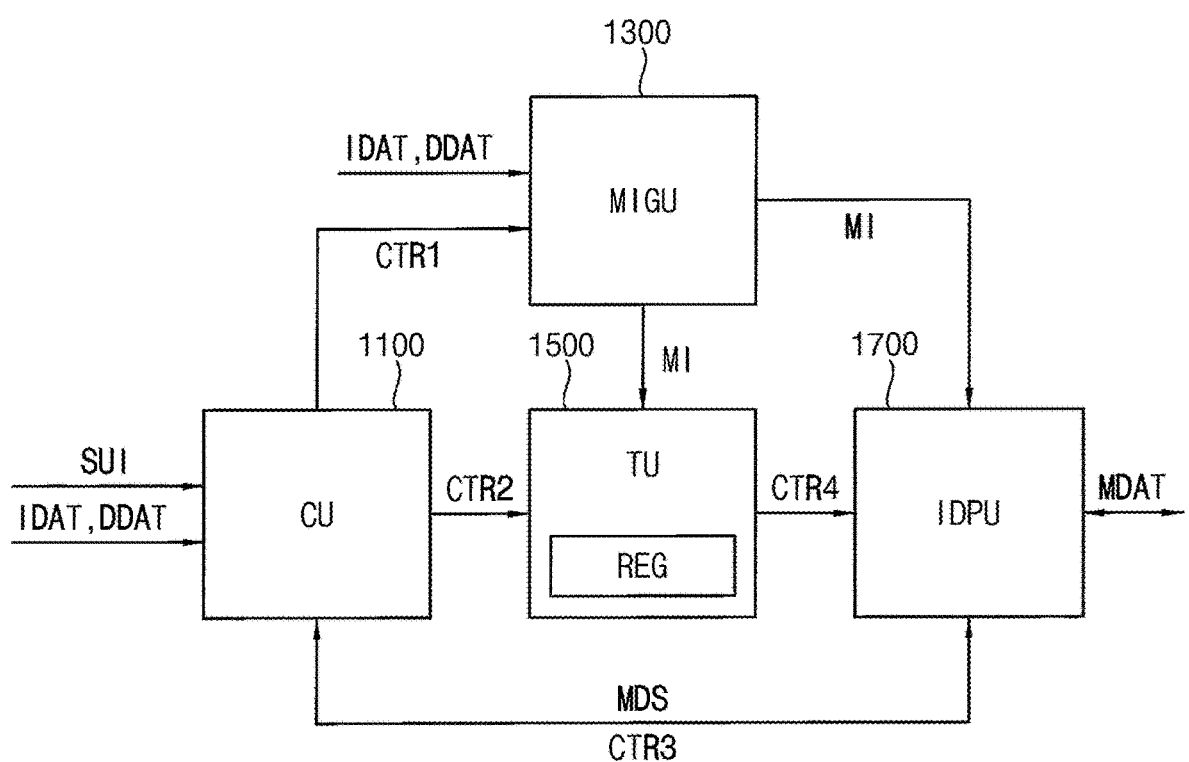
FIG. 12 is a block diagram illustrating an example embodiment of an automatic image processing unit included in the image processing device of FIG. 3 according to one or more example embodiments of the inventive concepts.

FIG. 12 is a block diagram illustrating an example embodiment of the automatic image processing unit in FIG. 3. Referring to FIGS. 3 and 12, the automatic image processing unit 100 may include a control unit (CU) 1100, a motion information generation unit (MIGU) 1300, a tracking unit (TU) 1500 and an image data providing unit (IDPU) 1700.

According to at least some example embodiments of the inventive concepts, any or all of the control unit (CU) 1100, motion information generation unit (MIGU) 1300, and tracking unit (TU) 1500 (and/or elements of any or all of the control unit (CU) 1100, motion information generation unit (MIGU) 1300, and tracking unit (TU) 1500) may be or include processing circuitry such as hardware including logic circuits; a hardware/software combination executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), and programmable logic unit, a microprocessor, application-specific integrated circuit (ASIC), etc.

The control unit 1100 may control over components 1300, 1500 and 1700 of the automatic image processing unit overall using a control signals CTR1, CTR2 and CTR3. The control unit 1100 may receive image data IDAT from the image sensor module 200 and may receive distance data DDAT from the distance sensor module 300.

In some example embodiments, the image data IDATA may be RGB image data. In some example embodiments, the image sensor module 200 may include either a Complementary Metal Oxide Semiconductor (CMOS) image sensor or a Charge-Coupled Device CCD image sensor, but example embodiments are not limited thereto. In some example embodiments, the distance data DDAT may be depth image data. In some example embodiments, the distance sensor module 300 may include a Time Of Flight TOF sensor, but example embodiments are not limited thereto.

The control unit 1100 may further receive a signal SUI input by a user from the user input unit 400. In some example embodiments, the signal input by the user may be a signal for determining a photographing mode, a photographing preparation time or forcibly designating the main object, but example embodiments are not limited thereto.

The motion information generating unit 1300 may receive the control signal CTR1 from the control unit 1100, may receive image data IDAT from the image sensor module 200 and distance data DDAT from the distance sensor module 300. The motion information generating unit 1300 may generate motion information MI based on the received data IDAT, DDAT and CTR1, and may transfer the motion information MI to the tracking unit 1500 or the image providing unit 1700. The motion information may be expressed in the form of a vector. The motion information may include information on a change in a relative position between the camera and the main object, information on a change in the distance between the camera and the main object and information on a change in the background.

The tracking unit 1500 may receive the control signal CTR2 from the control unit 1100 and may receive the motion information MI from the motion information generating unit 1300 to search and track the main object. The tracking unit 1500 may generate the control signal CTR4 based on the result of searching and tracking the main object, and may transfer the control signal CTR4 to the image providing unit 1700. The image providing unit 1700 receives the motion information MI and the control signals CTR3 and CTR4, and may generate the motion detection signals MDS and the image data MDAT according to the automatic photographing method of illustrated in FIGS. 1 and 2. Hereinafter, the operation of the tracking unit 1500 will be described in more detail.

Figure 13:
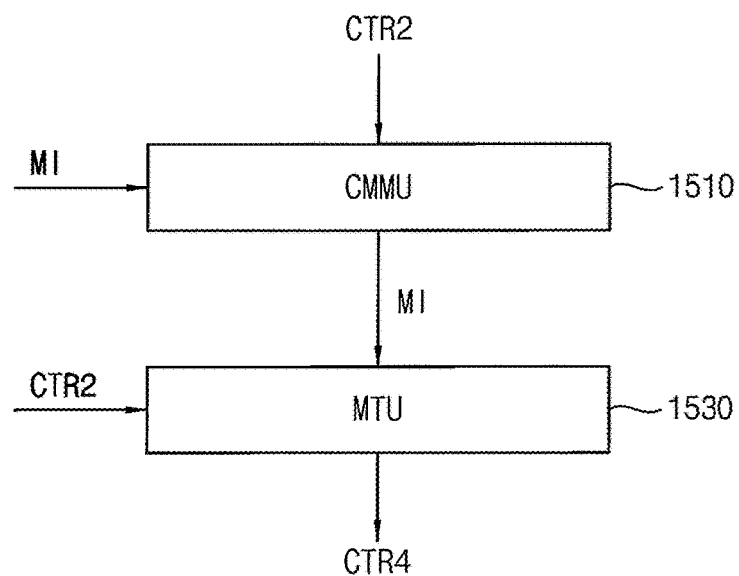
FIG. 13 is a block diagram illustrating an example embodiment of a tracking unit included in the automatic image processing unit of FIG. 12 according to one or more example embodiments of the inventive concepts.

FIG. 13 is a block diagram illustrating an example embodiment of a tracking unit 1500 included in the automatic image processing unit of FIG. 12. Referring to FIGS. 12 and 13, the tracking unit 1500 may include a main object management unit (CMMU) 1510 configured to manage a candidate group and a main object tracking unit (MTU) 1530.

The main object management unit 1510 may generate a candidate group of a main object based on the received motion information MI and the control signal CTR2. In some example embodiments, the control signal CTR2 may include color information and distance information, but example embodiments are not limited thereto. In some example embodiments, the main object management unit 1510 may generate the candidate group of the main object based on the color information and the distance information. In some example embodiments, the main object management unit 1510 may generate the candidate group of the main object after the photographer positions the camera at an arbitrary location. After generating the candidate group of the main object, the main object management unit 1510 may preliminarily determine the main object or forcibly designate the main object. The main object may be forcibly designated based on the control signal CTR2.

The main object tracking unit 1530 may receive the main object information MS from the main object management unit 1510 and may receive the control signal CTR2 from the control unit 1100 to decide and track the main object. In some example embodiments, the control signal CTR2 may include color information and distance information, but example embodiments are not limited thereto.

Figure 14:
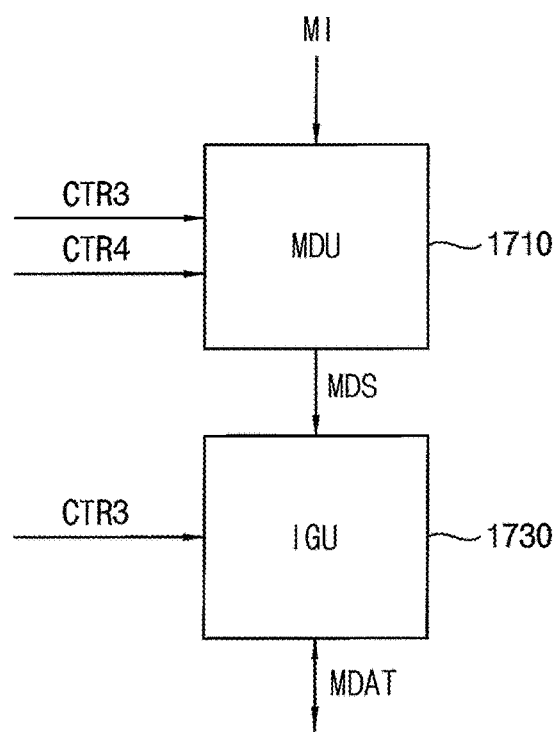
FIG. 14 is a block diagram illustrating an example embodiment of an image providing unit included in the automatic image processing unit of FIG. 12 according to one or more example embodiments of the inventive concepts.

FIG. 14 is a block diagram illustrating an example embodiment of an image providing unit included in the automatic image processing unit of FIG. 12. Referring to FIGS. 12 and 14, the image providing unit 1700 may include a motion detection unit (MDU) 1710 and an image generation unit (IGU) 1730.

The motion detection unit 1710 may receive the control signal CTR3 from the control unit 1100, may receive the motion information MI from the motion information generating unit 1300 and may receive the control signal CTR4 from the tracking unit 1500. The control signal CTR3 may include information regarding a photographing mode, but example embodiments are not limited thereto. In at least some one or more example embodiments of the inventive concepts, the photographing mode indicates one of operation modes for the camera to photograph the image, and may include a still image photographing mode, a panorama image photographing mode and a video image photographing mode corresponding to the image including a still image, a panorama image and a video image.

When the photographing mode is a still image photographing mode, the motion detection unit 1710 considers that the movement of the main object is not detected when the relative position between the camera and the main object, the distance between the camera and the main object and the background are not changed. Therefore, the motion detection unit 1710 may generate a motion detection signal MDS considering the movement of the main object is detected when any one of the background and the relative position and the distance between the camera and the main object is changed.

When the photographing mode is a panorama image photographing mode, the motion detection unit 1710 considers that the movement of the main object is not detected when the background and the relative position between the camera and the main object are changed but the distance between the camera and the main object is not changed. Therefore, the motion detection unit 1710 may generate the motion detection signal MDS considering the movement of the main object is detected when the background and the relative position between the camera and the main object are not changed or the distance between the camera and the main object is changed.

When the photographing mode is a video image photographing mode, the motion detection unit 1710 considers that the movement of the main object is not detected when the background is changed but the relative position and the distance between the camera and the main object are not changed. Therefore, the motion detection unit 1710 may generate the motion detection signal MDS considering the movement of the main object is detected when the background is not changed or the relative position and the distance between the camera and the main object are changed.

The motion detection unit 1710 may transfer the generated motion detection signal MDS to the image generation unit 1730. The image generation unit 1730 may receive the control signal CTR3 from the control unit 1100 and the motion detection signal MDS from the motion detection unit 1710.

The image generation unit 1730 may generate the still image by simply photographing the main object when the photographing mode is the still image photographing mode.

The image generation unit 1730 may generate the panorama image when the movement of the main object is detected after generating the plurality of single images, when the photographing mode is the panorama image photographing mode. In at least some example embodiments of the inventive concepts, the control signal CTR3 may include color information and distance information. One or more example embodiments of the inventive concepts are not limited thereto. The panorama image may be generated based on a plurality of single images generated by sensing a change in an angle of the camera and photographing the main object. According to an embodiment, the change of the angle of the camera may be detected based on the color information. In this case, the image generation unit 1730 may determine any one of the plurality of single image as a basic image. The image generation unit 1730 may generate reference images by removing an area including the main object from rest images among the plurality of single images except the basic image. The image generation unit 1730 may generate the panorama image based on the basic image and the reference images. According to an embodiments, the image determined as the basic image is an image having a median index value among index values that are assigned to the plurality of single images in a capturing order. According to another embodiment, the image determined as the basic image is an image having a median index value among index values that are assigned in a capturing order to the plurality of single images including the main object.

The image generation unit 1730 may generate the video image by photographing the main object only until the motion of the main object is detected.

Figure 15:
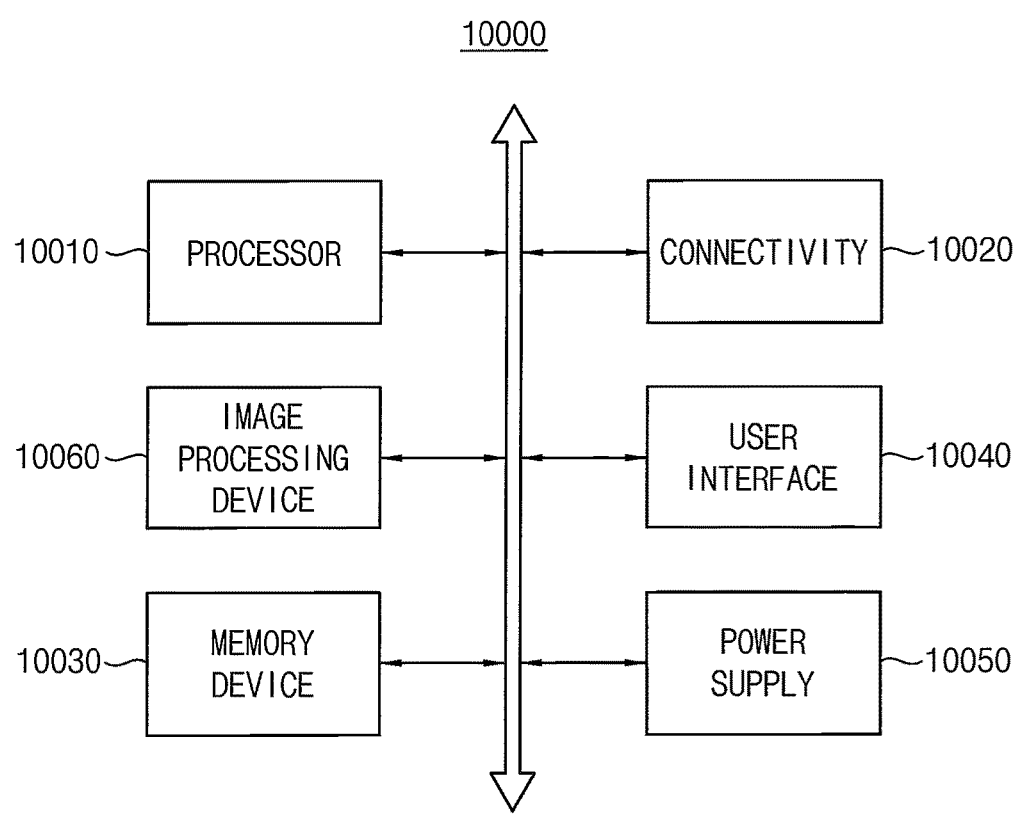
FIG. 15 is a block diagram illustrating an image processing system according to one or more example embodiments of the inventive concepts.

FIG. 15 is a block diagram illustrating an image processing system according to one or more example embodiments of the inventive concepts.

Referring to FIG. 15, the image processing system 10000 includes a processor 10010, a connectivity unit 10020, a memory device 10030, a user interface 10040, a power supply 10050, and an image processing device 10060. For example, the image processing system 10000 may be any mobile system or computing system.

The processor 10010 controls the overall operation of the image processing system 10000, executes an operating system and an application, and executes various computing functions such as specific calculations or tasks.

The communication unit 10020 may communicate with an external device. The memory device 10030 may store data processed by the processor 10010 or operate as a working memory.

The user interface 10040 may include one or more input devices such as a keypad, a button, a microphone, a touch screen, and/or one or more output devices such as a speaker, a display device. The power supply 10050 may supply an operating voltage of the image processing system 10000.

The image processing device 10060 is controlled by the processor 10010, and includes the image processing device according to one or more example embodiments of the inventive concepts.

As described above, the automatically photographing an image, the image processing device and the image processing system according to one or more example embodiments of the inventive concepts, when the main object include the photographer, the main object may be searched and tracked, and an image may be automatically photographed based on the photographing mode and the movement of the main object.

The inventive concept may be applied to various electronic devices and/or systems including the image processing device and the image processing system. For example, the inventive concept may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of one or more example embodiments of the inventive concepts and is not to be construed as limiting thereof. Although one or more example embodiments of the inventive concepts have been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of photographing an image using a camera, the method comprising:
    determining a photographing mode;
    searching and tracking a main object including a photographer; and
    automatically photographing the image based on,
        the photographing mode, and
        not detecting movement of the tracked main object,
    wherein the searching and tracking of the main object includes:
        generating a candidate group of the main object, the candidate group including a plurality of objects;
        determining a preliminary object from among the plurality of objects included in the candidate group;
        in response to determining that an object which differs from the preliminary object has been forcibly designated, deciding the forcibly designated object as the main object, and
        in response to determining that an object which differs from the preliminary object has not been forcibly designated deciding the preliminary object as the main object; and
        tracking the decided main object,
    wherein the generating of the candidate group of the main object includes excluding one or more objects from the candidate group based on at least one of color information and distance information, and
    wherein the determining of the preliminary object from among the plurality of objects included in the candidate group includes determining, the preliminary object based on color information corresponding to a skin tone of a human.

2. The method of claim 1, wherein the movement of the main object is detected based on a change in a relative position between a camera and the main object, a change in a distance between the camera and the main object and a change in a background.

3. The method of claim 1, wherein the photographing mode includes a still image photographing mode, a panorama image photographing mode and a video image photographing mode.

4. The method of claim 1, wherein determining the photographing mode includes:
    receiving a signal indicating the photographing mode input by a user; and
    determining the photographing mode based on the signal.

5. The method of claim 1, further comprising:
    determining that an object which differs from the preliminary object has be forcibly designated based on a signal input by user.

6. The method of claim 1, wherein the tracking of the decided main object includes tracking the decided main object based on color information and distance information.

7. The method of claim 1, wherein automatically photographing the image includes:
    generating a still image in response to determining that
        the photographing mode is a still image photographing mode,
        movement of the main object is not detected,
        a photographing preparation time has elapsed.

8. The method of claim 7, further comprising:
    detecting movement of the main object by detecting
        a change of a relative position between a camera and the main object,
        a change in a distance between the camera and the main object, and
        a change of a background,
    wherein the change of the relative position between the camera and the main object, the change in the distance between the camera and the main object and the change of the background are detected based on motion information and distance information for each of the main object and the background.

9. The method of claim 8, further comprising:
    determining that the movement of the main object is not detected in response to determining that
        the relative position between the camera and the main object,
        a distance between the camera and the main object, and
        a background are not changed, and
        a photographing preparation time has elapsed.

10. The method of claim 1, wherein automatically photographing the image includes:
    capturing a plurality of single images by detecting changes in an angle of camera in response to determining that
        the photographing mode is a panorama image photographing mode, and
        movement of the main object is not detected, and
        a photographing preparation has elapsed.

11. The method of claim 10, further comprising:
    determining that the movement of the main object is not detected in response to determining that a background and a relative position between the camera and the main object are changed, and determining that a distance between the camera and the main object is not changed.

12. The method of claim 10, wherein automatically photographing the image further includes:
    generating a panorama image based on the plurality of the single images.

13. The method of claim 12, wherein generating the panorama image includes:
    determining a basic image among the plurality of single images; and
    generating reference images by removing an area including the main object from rest images among the plurality of single images except the basic image.

14. The method of claim 13, wherein the image determined as the basic image is an image having a median index value among index values that are assigned to the plurality of single images in a capturing order.

15. The method of claim 1, wherein automatically photographing the image includes:

generating a video image in response to determining that,
  the photographing mode is a video photographing mode,
  movement of the main object is not detected, and
  a photographing preparation time has elapsed.

16. The method of claim 15, further comprising:
determining that the movement of the main object is not detected in response to determining that a background is changed and a relative position and a distance between the camera and the main object are not changed.

17. A method of automatically photographing an image using a camera, the method comprising:
  searching and tracking a main object including a photographer; and
  generating a plurality of single images by detecting changes in an angle of a camera when a photographing mode of the camera is a panorama image photographing mode and when a movement of the main object is not detected until a photographing preparation time elapses; and
  generating the panorama image based on the plurality of single images,
  wherein the searching and tracking of the main object includes:
    generating a candidate group of the main object, the candidate group including a plurality of objects;
    determining a preliminary object from among the Plurality of objects included in the candidate group;
    in response to determining that an object which differs from the preliminary object has been forcibly designated, deciding the forcibly designated object as the main object; and
    in response to determining that an object which differs from the preliminary object has not been forcibly designated, deciding the preliminary object as the main object; and
    tracking the decided main object,
  wherein the generating of the candidate group of the main object incudes excluding one or more objects from the candidate group based on at least one of color information and distance information, and
  wherein the determining of the preliminary object from among the plurality of objects included in the candidate group includes determining the preliminary object based on color information corresponding to a skin tone of a human.

18. A method of automatically photographing an image using a camera, the method comprising:
  searching and tracking a main object including a photographer; and
  generating a video image when a photographing mode of a camera is a video image photographing mode, and when a movement of the main object is not detected until a photographing preparation time elapses,
  wherein the searching and tracking of the main object includes:
    generating a candidate group of the main object, the candidate group including a plurality of objects;
    determining a preliminary object from among the Plurality of objects included in the candidate group;
    in response to determining that an object which differs from the preliminary object has been forcibly designated, deciding the forcibly designated object as the main object, and
    in response to determining that an object which differs from the preliminary object has not been forcibly designated, deciding the prelirninary object as the main object; and
    tracking the decided main object,
  wherein the generating of the candidate group of the main object incudes excluding one or more objects from the candidate group based on at least one of color information and distance information, and
  wherein the determining of the preliminary object from among the plurality of objects included in the candidate group includes determining the preliminary object based on color information corresponding to a skin tone of a human.

* * * * *